US012296813B2

(12) United States Patent
Mühleisen

(10) Patent No.: US 12,296,813 B2
(45) Date of Patent: May 13, 2025

(54) METHOD OF OPERATION FOR A HYBRID DRIVE SYSTEM, AND CONTROLLER

(71) Applicant: AUDI AG, Ingolstadt (DE)

(72) Inventor: Martin Mühleisen, Waldstetten (DE)

(73) Assignee: AUDI AG, Ingolstadt (DE)

( * ) Notice: Subject to any disclaimer, the term of this patent is extended or adjusted under 35 U.S.C. 154(b) by 216 days.

(21) Appl. No.: 17/975,439

(22) Filed: Oct. 27, 2022

(65) Prior Publication Data
US 2023/0134575 A1 May 4, 2023

(30) Foreign Application Priority Data

Oct. 28, 2021 (DE) .......................... 102021128059.1

(51) Int. Cl.
B60W 20/12 (2016.01)
B60L 50/60 (2019.01)
B60L 58/40 (2019.01)
B60W 10/08 (2006.01)
B60W 20/13 (2016.01)
G01C 21/36 (2006.01)

(52) U.S. Cl.
CPC ............ B60W 20/12 (2016.01); B60L 50/60 (2019.02); B60L 58/40 (2019.02); B60W 10/08 (2013.01); B60W 20/13 (2016.01); B60L 2240/662 (2013.01); B60L 2240/667 (2013.01); G01C 21/3691 (2013.01)

(58) Field of Classification Search
CPC .......................... B60L 58/10; B60W 2530/12
See application file for complete search history.

(56) References Cited

U.S. PATENT DOCUMENTS

| 2003/0160455 A1* | 8/2003 | Hu ........................ B60W 10/06 290/40 C |
| 2009/0040033 A1* | 2/2009 | Uchida .................... B60L 58/15 340/439 |
| 2012/0173062 A1* | 7/2012 | Madurai Kumar ... B60W 20/13 903/903 |
| 2012/0323419 A1* | 12/2012 | Hashimoto ........... B60W 20/15 903/930 |
| 2014/0000245 A1* | 1/2014 | Harada ................. F01N 3/2026 60/286 |
| 2014/0288736 A1* | 9/2014 | Martin .................... F02D 29/02 903/903 |
| 2017/0138539 A1* | 5/2017 | Aoki ......................... F17C 5/06 |
| 2019/0168735 A1* | 6/2019 | Morisaki ............... B60W 20/12 |
| 2019/0168736 A1* | 6/2019 | Morisaki ............... B60W 10/06 |
| 2019/0168741 A1* | 6/2019 | Morisaki .................. B60K 6/20 |

(Continued)

FOREIGN PATENT DOCUMENTS

| AT | 508065 A2 | 10/2010 | |
| CN | 114144345 A * | 3/2022 | ............. B60K 6/387 |

(Continued)

Primary Examiner — Jelani A Smith
Assistant Examiner — Jacob Daniel Underbakke
(74) Attorney, Agent, or Firm — Seed IP Law Group LLP

(57) ABSTRACT

A method for operating a drive system of a hybrid vehicle is provided, which comprises reserving, by a controller of the drive system of the hybrid vehicle, electrical energy stored in a traction battery of the drive system and intended for an electrical heating of a catalyst of the drive system. A controller for a drive system of a hybrid vehicle to carry out such a method is also provided.

10 Claims, 2 Drawing Sheets

(56) References Cited

U.S. PATENT DOCUMENTS

2019/0186316 A1\* 6/2019 Ono .................... B60W 10/06
2019/0232948 A1\* 8/2019 Nawata ................. B60K 6/445

FOREIGN PATENT DOCUMENTS

| DE | 102018127550 A1 | | 12/2018 | |
|---|---|---|---|---|
| JP | 2013241114 A | \* | 12/2013 | |
| WO | WO-2011160995 A1 | \* | 12/2011 | ............... B60K 6/46 |
| WO | WO-2014167412 A1 | \* | 10/2014 | ............ B60W 10/06 |

\* cited by examiner ically heatable catalyst prior to starting a combustion engine of the hybrid vehicle to a working temperature. In this way, it is assured that the exhaust gas emitted immediately by the combustion engine just after starting is effectively free of pollutants and in this way the hybrid vehicle in combustion engine operation will at all times meet the standard in regard to the exhaust of the drive system, such as EU7.
METHOD OF OPERATION FOR A HYBRID DRIVE SYSTEM, AND CONTROLLER

BACKGROUND

Technical Field

Embodiments of the invention relate to a method for operating a drive system of a hybrid vehicle, in which a controller of a drive system of a hybrid vehicle reserves electrical energy stored in a traction battery of the drive system and intended for an electrical heating of a catalyst of the drive system. Moreover, embodiments of the invention relate to a controller for a drive system of a hybrid vehicle.

Description of the Related Art

Methods of the kind specified above serve for adjusting the temperature of the electrically heatable catalyst prior to starting a combustion engine of the hybrid vehicle to a working temperature. In this way, it is assured that the exhaust gas emitted immediately by the combustion engine just after starting is effectively free of pollutants and in this way the hybrid vehicle in combustion engine operation will at all times meet the standard in regard to the exhaust of the drive system, such as EU7.

This is accomplished by a suitable preheating of the catalyst, i.e., a starting of the electric heating at the proper time, which is prior to the time of a predicted starting of the combustion engine, and a reaching of the working temperature of the catalyst, thanks to an adequate electrical energy.

Thus, US 2014/0000245 A1 describes an operating method for a drive system of a hybrid vehicle in which, during an electrical driving of the hybrid vehicle, a maximum electrical energy available for the heating of a catalyst of the drive system is calculated in dependence on the electrical energy required for the starting of a combustion engine of the drive system or the electrical power of another electrical consumer of the hybrid vehicle, the available electrical power of a traction battery and the electrical power of an electric motor of the drive system.

DE 10 2018 127 550 A1 discloses another such operating method for a drive system of a hybrid vehicle in which, during the driving of the hybrid vehicle, the time of the next starting of the combustion engine of the drive system is calculated and a catalyst of the drive system is electrically heated in good time prior to that time.

Many hybrid drive systems, i.e., drive systems of hybrid vehicles, comprise in addition to the catalyst an absorber placed upstream from the catalyst in the exhaust gas flow, which removes the majority of the pollutants from the exhaust gas emitted directly by the combustion engine. The optimal working temperature range of the absorber is usually lower than the optimal working temperature range of the catalyst.

US 2019/0186316 A1 discloses an operating method for an exhaust gas system with electrical heating as well as an absorber and a catalyst, the optimal working temperature ranges of which are different from each other. In the method, a reserved electrical energy stored in a traction battery is used only partly, so as not to set the temperature of the exhaust gas system by means of the electrical heating between the optimal working temperature ranges for a starting of the combustion engine.

The maximum required electrical energy for a suitable preheating of the catalyst is reserved, however this reduces the electrical energy of the traction battery practically available for operating the hybrid vehicle, i.e., the electrical energy which can be drawn from the traction battery for the driving of the hybrid vehicle or which can be stored by recuperation in the traction battery. The operation of the hybrid vehicle usually involves an electrical parking (e-parking), an electrical driving (e-driving), a cruising mode and a boost mode. Consequently, a hybrid operation of the hybrid vehicle is impaired as a result of the reserving of electrical energy for the electrical heating of the catalyst and the efficiency of the hybrid vehicle as well as the environmental footprint ($CO_2$ emission) of the hybrid vehicle are decreased.

BRIEF SUMMARY

Some embodiments provide a method for operating a drive system of a hybrid vehicle which makes possible a high efficiency of the hybrid vehicle and a good environmental footprint of the hybrid vehicle. Some embodiments also provide a controller for a drive system of a hybrid vehicle.

Some embodiments include a method for operating a drive system of a hybrid vehicle, in which a controller of a drive system of a hybrid vehicle reserves electrical energy stored in a traction battery of the drive system and intended for an electrical heating of a catalyst of the drive system. In this way, the controller makes sure that the electrically heatable catalyst can achieve a working temperature upon starting a combustion engine of the hybrid vehicle.

In the method, the controller determines the reserved electrical energy in variable manner. In other words, the controller makes possible a situation-dependent reservation of electrical energy. For example, the electrical energy expended to establish the working temperature depends on a starting temperature of the catalyst prior to the electrical heating. If the temperature difference between the starting temperature and the working temperature is slight, only slight electrical energy is reserved. On the other hand, if the temperature difference is large, a large electrical energy must be reserved.

In this way, the reserved electrical energy can be determined in flexible manner, each time in the minimum amount, so that the efficiency of the hybrid vehicle is increased and the environmental footprint of the hybrid vehicle is improved.

The reserved electrical energy may be determined in dependence on current or forecast weather data. A starting temperature of the catalyst depends at first on an outdoor temperature of the hybrid vehicle. Weather data can be localized to a position of the hybrid vehicle and may include the outdoor temperature. The current weather data take precedence if a starting of the combustion engine will occur in the near future. Of course, alternatively or additionally, an outdoor temperature as detected by an environmental sensor of the hybrid vehicle or an outdoor temperature as detected by a temperature sensor of the catalyst can be consulted in order to determine the reserved electrical energy. The forecast weather data take precedence for a starting of the combustion engine in a more distant future, for example, after a period of parking of the hybrid vehicle.

A communication system of the hybrid vehicle can receive the weather data from a server. The communication system produces a wireless connection of the hybrid vehicle with the server, by which the server transmits the weather data.

The reserved electrical energy may be determined in dependence on data regarding a parking situation of the hybrid vehicle at a destination. The parking situation may involve an outdoor parking place, a parking structure, an underground garage, or a private garage. The parking structure, the underground garage, or the private garage may be heated. Accordingly, the parking situation may include the state of heating of the parking place. If a starting of the combustion engine occurs after being parked, the controller can determine a larger reserved electrical energy in the case of the outdoor parking place than in the case of the parking place in a heated private garage.

The reserved electrical energy may be determined in dependence on a planned departure time of the hybrid vehicle for a subsequent trip. If the hybrid vehicle reaches a parking place in combustion engine driving and the anticipated parking time is short, the catalyst will cool down only slightly during the parking and consequently will still have a high starting temperature at the planned departure time. The controller can determine a slight reserved electrical energy. On the other hand, if the anticipated parking time is long, the controller must determine a large reserved electrical energy.

In one embodiment, a driver of the hybrid vehicle enters data regarding the parking situation and/or a departure time by means of an infotainment system of the hybrid vehicle. The infotainment system provides a comfortable human/machine interface (HMI), making it possible for the driver to enter data, for example by means of a touch screen, which the hybrid vehicle cannot detect or receive by itself. Alternatively, the driver can use a mobile terminal device coupled with the hybrid vehicle for the entering of the data.

In this context, it is pointed out that the driver should make sure of entering the mentioned data properly, since too little reserved electrical energy could lead to unpleasant restrictions, such as a departure delay, which will affect the driving experience.

Ideally, the reserved electrical energy will be determined during a trip of the hybrid vehicle in dependence on a distance of the hybrid vehicle from a trip destination as provided by a navigation system of the hybrid vehicle. In this way, the efficiency of the hybrid vehicle may differ, depending on the distance, i.e., at the start of a trip of the hybrid vehicle the controller will determine a different reserved electrical energy than toward the end of the trip or midway during the trip. During the trip, the controller can constantly provide the optimal efficiency of the hybrid vehicle which is possible each time.

If the navigation system has a self-learning function, for example if it comprises an artificial neural network, the navigation system can recognize a regular pattern in a number of trips of the vehicle and propose a destination to the driver according to the pattern. For example, the artificial neural network can learn that the vehicle regularly drives certain stretches on certain days of the week and/or certain times of the day. The driver can then usually just confirm the destination proposed by the navigation system and only reject it in exceptional, i.e., rare instances, and enter a different destination. In this way, the operating comfort of the driver is increased.

The reserved electrical energy can be determined to increase with decreasing distance. In other words, at the start of the trip the controller can determine the reserved electrical energy to be low and to increase the efficiency of the hybrid vehicle, and toward the end of the trip it can determine the reserved electrical energy to be high and to reduce the efficiency of the hybrid vehicle.

In many embodiments, the reserved electrical energy is determined by means of a characteristic map of the drive system which is empirically implemented in the controller. The characteristic map can be generated by means of a series of trials in different driving situations and parking situations of the hybrid vehicle and saved in the form of a data set in the controller.

Some embodiments include a controller for a drive system of a hybrid vehicle. Many hybrid vehicles comprise such a controller, so that there are numerous possible applications. If the control logic of an existing controller is implemented as software, the controller can be converted into a controller by a simple software update.

The controller may be adapted to controlling a drive system of a hybrid vehicle having a traction battery and an electrically heatable catalyst in order to carry out a method as described herein. In this way, the controller increases the efficiency of the hybrid vehicle and the controller improves the environmental footprint of the hybrid vehicle.

An advantage of the method described herein is that it raises the efficiency of the hybrid vehicle and improves the environmental footprint of the hybrid vehicle. A further advantage is that the increased efficiency can be easily achieved by replacing an existing controller or by configuring an existing controller. Not least of all, the method described herein also enhances the driving comfort of the hybrid vehicle, since the combustion engine operation is reduced in favor of an electrical driving operation.

BRIEF DESCRIPTION OF THE SEVERAL VIEWS OF THE DRAWINGS

Embodiments of the invention are shown schematically in the drawings and shall be further described with reference to the drawings.

DETAILED DESCRIPTION

Figure 1:
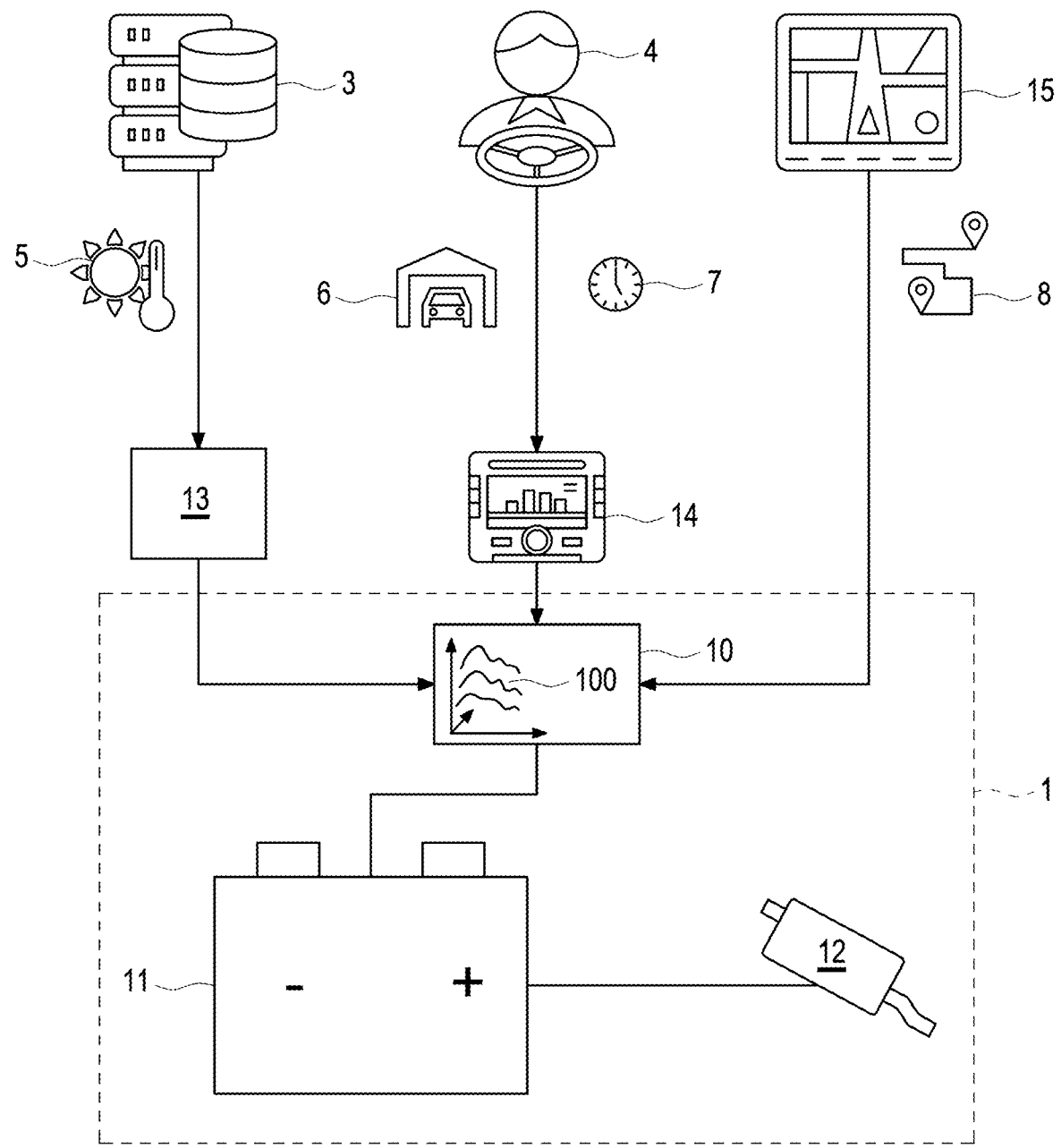
FIG. 1 shows in a block diagram, a drive system of a hybrid vehicle with a controller according to one embodiment for the operation of a drive system.

FIG. 1 shows in a block diagram a drive system 1 of a hybrid vehicle having a controller 10 according to one embodiment for operating the drive system 1. The drive system 1 furthermore comprises a traction battery 11 and an electrically heatable catalyst 12.

Moreover, the hybrid vehicle may include a communication system 13, an infotainment system 14 and a navigation system 15.

The controller 10 is adapted to implement a method for control of the drive system 1, as follows.

In the method for operating the drive system 1 of the hybrid vehicle, the controller 10 reserves electrical energy stored in a traction battery 11 of the drive system 1 which is intended for an electrical heating of the catalyst 12 of the drive system 1. The controller 10 determines the reserved electrical energy 20 in a variable manner.

The reserved electrical energy 20 can be determined as a function of current or forecast weather data 5. In particular, the communication device 13 of the hybrid vehicle can receive the weather data 5 from a server 3.

Moreover, the reserved electrical energy 20 can be determined in dependence on data 6 regarding a parking situation of the hybrid vehicle at a destination. The reserved electrical energy 20 can also be determined in dependence on a planned departure time 7 of the hybrid vehicle for a following trip. In these embodiments, a driver 4 of the hybrid vehicle enters the data 6 regarding the parking situation or the departure time 7 by means of an infotainment system 14 of the hybrid vehicle.

The reserved electrical energy 20 may be determined during a drive of the hybrid vehicle in dependence on a distance 8 of the hybrid vehicle from a trip destination as provided by a navigation system 15 of the hybrid vehicle. In particular, the reserved electrical energy 20 can be determined to increase with decreasing distance 8.

In many embodiments, the reserved electrical energy 20 will be determined by means of a characteristic map 100 of the drive system 1 which is empirically implemented in the controller 10.

Figure 2:
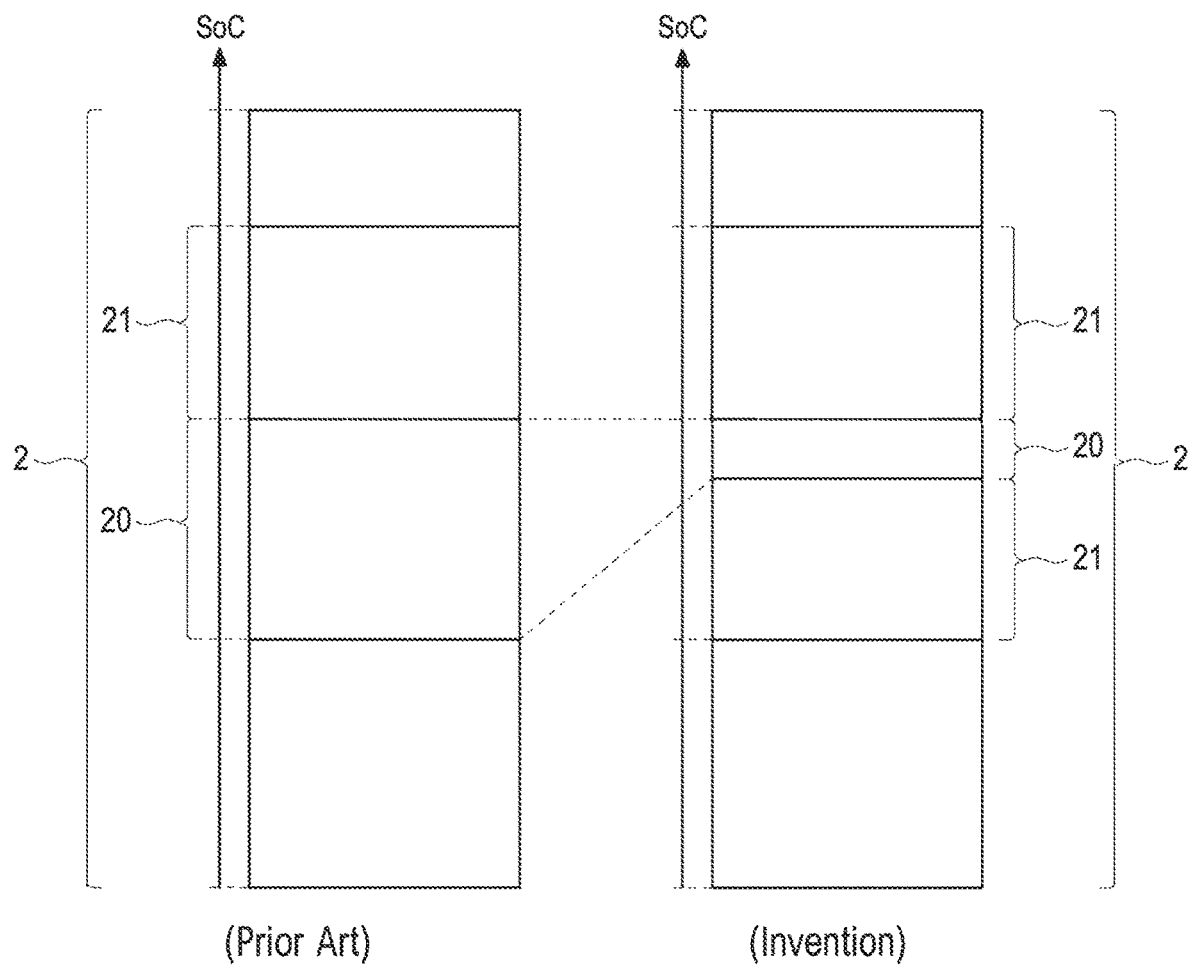
FIG. 2 shows in a bar graph, the electrical energy stored in the traction battery and reserved for an electrical heating of the catalyst.

FIG. 2 shows in a bar chart the electrical energy 2 stored in a traction battery 11 shown in FIG. 1 and reserved for an electrical heating of the catalyst 12 shown in FIG. 1 according to previous technologies and according to an embodiment described herein.

Each bar graph has an ordinate on which is plotted the electrical energy (State of Charge, SoC) stored in the traction battery 11. Operating methods known in previous technologies reserve a constant reserved electrical energy 20 for the electrical heating of the catalyst 12. Accordingly, the energy 21 which can be used for the driving or stored by recuperation is likewise constant.

On the other hand, the operating method as described herein reserves a variable reserved electrical energy 20 for the electrical heating of the catalyst 12, which corresponds at most to the constant reserved electrical energy 20 in the prior art and which is usually less than the constant reserved electrical energy 20 in the prior art.

Accordingly, the energy 21 which can be used for the driving or stored by recuperation is likewise variable. The variable usable or storable energy 21 corresponds at minimum to the constant usable or storable energy 21 of previous technologies and it is usually greater than the constant usable or storable energy 21 of the previous technologies.

German patent application no. 10 2021 128059.1, filed Oct. 28, 2021, to which this application claims priority, is hereby incorporated herein by reference, in its entirety.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a drive system of a hybrid vehicle, comprising:
   determining, by a controller the drive system of the hybrid vehicle, first reserved electrical energy intended for a first electrical heating of a catalyst of the drive system based on a difference between a first starting temperature of a catalyst of the drive system prior to the first electrical heating of the catalyst of the drive system and a working temperature of the catalyst of the drive system;
   reserving, by the controller of the drive system of the hybrid vehicle, the first reserved electrical energy among stored electrical energy stored in a traction battery of the drive system and intended for the first electrical heating of the catalyst of the drive system;
   determining, by the controller of the drive system of the hybrid vehicle, second reserved electrical energy intended for a second electrical heating of the catalyst of the drive system based on a difference between a second starting temperature of the catalyst of the drive system prior to the second electrical heating of the catalyst of the drive system and the working temperature of the catalyst of the drive system; and
   reserving, by the controller of the drive system of the hybrid vehicle, the second reserved electrical energy among stored electrical energy stored in the traction battery of the drive system and intended for the second electrical heating of the catalyst of the drive system,
   wherein the first starting temperature of the catalyst of the drive system is different from the second starting temperature of the catalyst of the drive system, and
   wherein the first reserved electrical energy is different from the second reserved electrical energy.

2. The method according to claim 1, wherein the first reserved electrical energy or the second reserved electrical energy is determined based on current or forecast weather data.

3. The method according to claim 2, further comprising:
   receiving, by a communication system of the hybrid vehicle, the current or forecast weather data.

4. The method according to claim 1, wherein the first reserved electrical energy or the second reserved electrical energy is determined based on data regarding a parking situation of the hybrid vehicle at a destination.

5. The method according to claim 1, wherein the first reserved electrical energy or the second reserved electrical energy is determined based on a planned departure time of the hybrid vehicle for a subsequent trip.

6. The method according to claim 4, further comprising:
   receiving, by an infotainment system of the hybrid vehicle, data regarding the parking situation.

7. The method according to claim 5, further comprising:
   receiving, by an infotainment system of the hybrid vehicle, data regarding the planned departure time.

8. The method according to claim 1, wherein the first reserved electrical energy or the second reserved electrical energy is determined during a trip of the hybrid vehicle based on a distance of the hybrid vehicle from a destination of the trip as provided by a navigation system of the hybrid vehicle.

9. The method according to claim 8, wherein the first reserved electrical energy or the second reserved electrical energy is determined to increase with decreasing distance.

10. A controller for a drive system of a hybrid vehicle including a traction battery and an electrically-heatable catalyst, the controller adapted to control the drive system of the hybrid vehicle to carry out a method comprising:
    determining, by a controller the drive system of the hybrid vehicle, first reserved electrical energy intended for a first electrical heating of a catalyst of the drive system based on a difference between a first starting temperature of a catalyst of the drive system prior to the first electrical heating of the catalyst of the drive system and a working temperature of the catalyst of the drive system;
    reserving, by the controller of the drive system of the hybrid vehicle, the first reserved electrical energy among stored electrical energy stored in the traction battery of the drive system and intended for the first electrical heating of the catalyst of the drive system;
    determining, by the controller of the drive system of the hybrid vehicle, second reserved electrical energy intended for a second electrical heating of the catalyst of the drive system based on a difference between a second starting temperature of the catalyst of the drive system prior to the second electrical heating of the catalyst of the drive system and the working temperature of the catalyst of the drive system; and reserving, by the controller of the drive system of the hybrid vehicle, the second reserved electrical energy among stored electrical energy stored in the traction battery of the drive system and intended for the second electrical heating of the catalyst of the drive system, wherein the first starting temperature of the catalyst of the drive system is different from the second starting temperature of the catalyst of the drive system, and wherein the first reserved electrical energy is different from the second reserved electrical energy.

\* \* \* \* \*